(No Model.)

C. KEHR.
TIRE.

No. 517,417. Patented Mar. 27, 1894.

Witnesses

Inventor
Cyrus Kehr

UNITED STATES PATENT OFFICE.

CYRUS KEHR, OF LAKE SIDE, ILLINOIS.

TIRE.

SPECIFICATION forming part of Letters Patent No. 517,417, dated March 27, 1894.

Application filed July 6, 1893. Serial No. 479,706. (No model.)

*To all whom it may concern:*

Be it known that I, CYRUS KEHR, a citizen of the United States, residing at Lake Side, in the county of Cook and State of Illinois, have invented certain new and useful Improvements in Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This improvement relates particularly to pneumatic or similar tires in which the outer tube is open along a line extending along the middle of the seat or portion which rests in the rim of the wheel.

The object of the invention is to produce such a tire provided with efficient and convenient means for holding its edges together along said opening.

Figure 1:
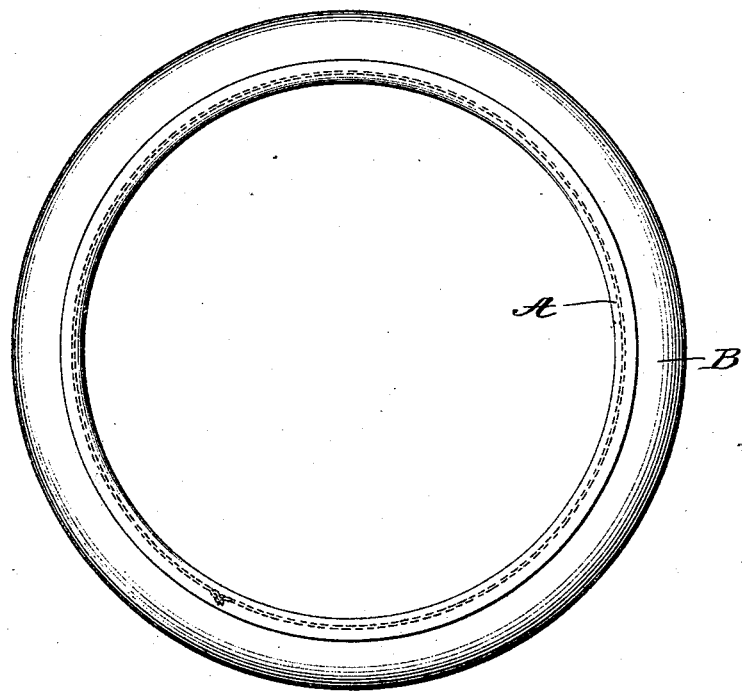
Figure 2:
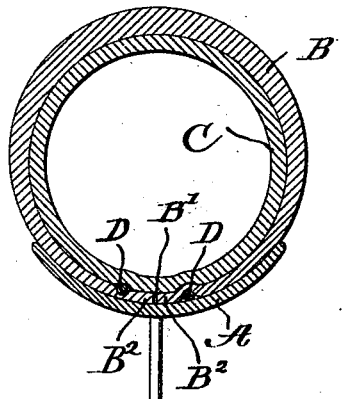
Figure 3:
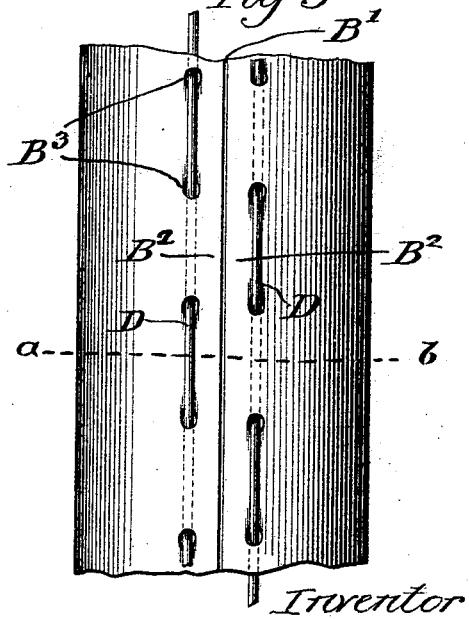

In the accompanying drawings: Figure 1 is a side view of a tire embodying my invention, the tire being in place upon a wheel rim. Fig. 2 is a section in the line $a—b$ of Fig. 3. Fig. 3 is a view of the tread of the tire.

In said drawings, A is the rim.

B is the outer tube of the tire, and C is the inner tube of the tire. Said inner tube is to be air tight and may be of any well known form. The tube, B, is of relatively strong construction, as is usual with the construction of the outer tube of pneumatic tires.

Along a line extending along the middle of the seat or portion lying in the rim, A, the tube, B, is open as indicated at $B'$, all around the tire, in order that the tube, C, may be readily inserted and removed and in order that access may be had to said tube, C, at any point of the circumference of the tire. The edges, $B^2$, of the tube, B, along said opening are adapted to meet closely. Said tube, B, may be manufactured by entirely surrounding an annular mandrel with sheet rubber and then placing the mandrel and rubber surrounding it into a mold and there pressing and vulcanizing and then removing the mandrel and tube surrounding the mandrel from the mold and slitting said tube all around the interior of the mandrel.

$B^3$ designates holes of any desired form extending through the tube, B, at suitable distances from each other all around the tire at each side of and in lines parallel to the edges, $B^2$. At each side of said opening, $B'$, a wire or other similar binder, D, is laced through the holes, $B^3$, entering the tube, B, through one hole, $B^3$, and extending out of said tube through the next hole, $B^3$, so that portions of the wall of the tube, B, lie alternately at opposite sides of said binder. The holes, $B^3$, should be made large enough to permit the ready insertion of the binders. The latter extend all around the tire, and when the tire is in place upon the rim of the wheel the meeting ends of the binders are to be united by twisting around each other or by other suitable means, so as to give to said binders sufficient tension to draw each edge, $B'$, toward the middle of and tightly against the rim. If so desired, the ends of the binders may be united before the tire is put on the rim, the circumference of the binders being made a little less than the circumference of the rim at its edges. When so made, one portion of the tire may be put into the middle of the rim and rest then drawn over the rim. Then, on inflating, the binders and the edges, $B^2$, will be separated somewhat and rest against the rim toward the edges of the latter. Even if the binders are shortened after the tire is on the rim, they may be thus left loose on the middle of the latter. It will be seen that this means of fastening may be applied to the tube, B, without forming the latter of any special shape along the tread. All of the tread, and indeed the entire wall of the tube, may be of uniform thickness. This simplifies the work of building up the tube upon the mandrel and molding it.

I claim as my invention—

1. The combination with the tube, B, open along a line extending along the middle of the seat, of binders, D, extending around said tire at each side of and parallel to said opening and having portions of the wall of said tube, B, alternately at opposite sides, substantially as described.

2. The combination with the tube, B, open along a line extending along the middle of the seat, and having at each side of said opening a series of holes, B³, of binders, D, placed through said opening by extending into and out of said tube, substantially as described.

3. The combination with the tube, B, open along a line extending along the middle of the seat, of binders, D, extending around said tire at each side of and parallel to said opening and having portions of the wall of said tube, B, alternately at opposite sides, and a rim, A, substantially as described.

4. The combination with the tube, B, open along a line extending along the middle of the seat, and having at each side of said opening a series of holes, B³, of binders, D, placed through said opening by extending into and out of said tube, and a rim, A, substantially as described.

In testimony whereof I affix my signature, in presence of two witnesses, this 29th day of June, 1893.

CYRUS KEHR.

Witnesses:
 ALICE LINEE,
 AMBROSE RISDON.